C. S. RUFF.
ADJUSTABLE CRANK HANGER FOR POLYCYCLES.
APPLICATION FILED SEPT. 26, 1913.
1,093,729.
Patented Apr. 21, 1914.
2 SHEETS—SHEET 1.
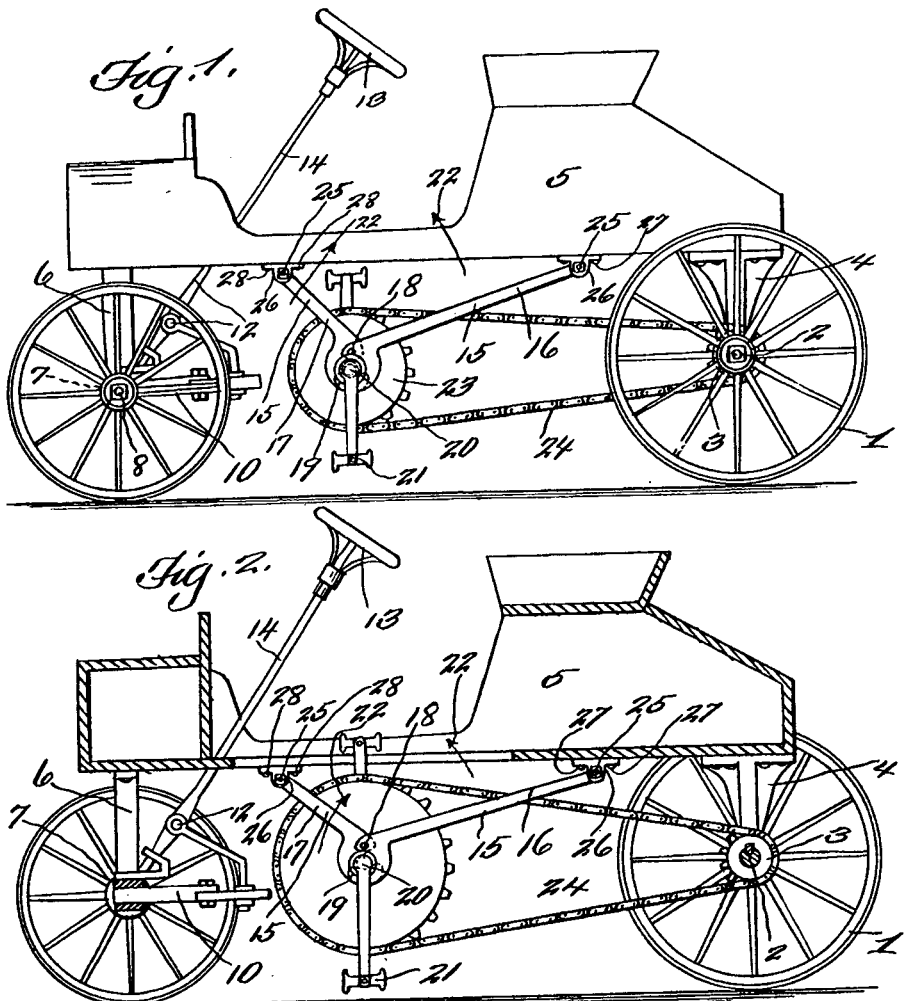

C. S. RUFF.
ADJUSTABLE CRANK HANGER FOR POLYCYCLES.
APPLICATION FILED SEPT. 26, 1913.
1,093,729.
Patented Apr. 21, 1914.
2 SHEETS—SHEET 2.
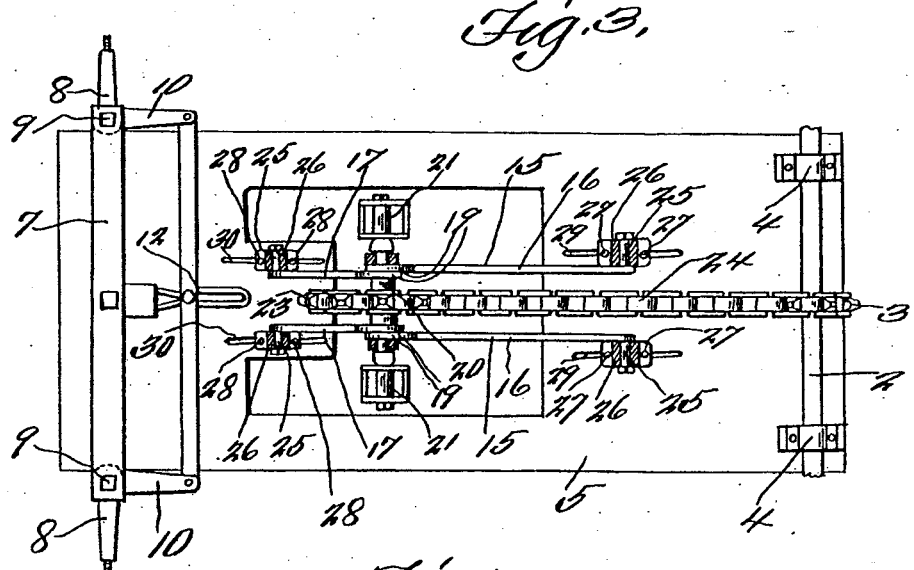
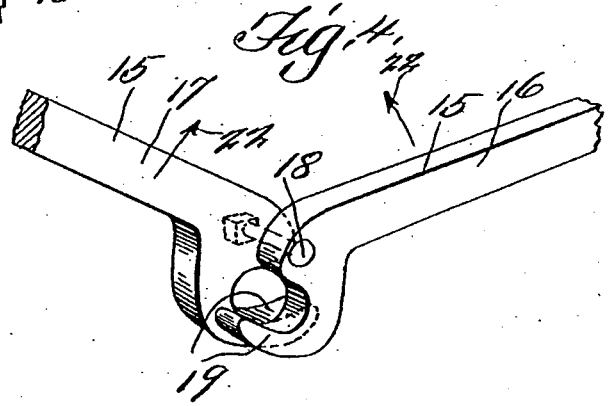

UNITED STATES PATENT OFFICE.

CHRISTIAN S. RUFF, OF RIVERSIDE, NEW JERSEY.

ADJUSTABLE CRANK-HANGER FOR POLYCYCLES.

1,093,729.  Specification of Letters Patent.  Patented Apr. 21, 1914.

Application filed September 26, 1913. Serial No. 792,067.

*To all whom it may concern:*

Be it known that I, CHRISTIAN S. RUFF, a citizen of the United States, residing at Riverside, in the county of Burlington and State of New Jersey, have invented a new and useful Adjustable Crank-Hanger for Polycycles; and I do hereby declare the following to be a full, clear, and exact description of the invention, such as will enable others skilled in the art to which it appertains to make and use the same.

This invention relates to a new and useful adjustable crank-hanger for polycycles.

One of the features of the invention is the provision of a bracket support for detachably holding the pedal crank shaft, whereby the crank shaft may be removed, for the insertion of another crank shaft having a larger diameter of sprocket wheel, whereby the speed of the vehicle may be increased.

In order to insert a sprocket wheel of larger diameter having a larger ratio in order to increase the speed of the vehicle, the bracket supports have to be adjustable relative to the body of the vehicle, which is another feature of the invention, each bracket support comprising two pivotal sections, so that each bracket may be adjusted so that the pedals will not strike or come too close to the ground when operating the same.

In practical fields the details of construction may necessitate alterations, to which the patentee is entitled, provided the alterations fall within the scope of what is claimed.
The invention comprises further features and combination of parts, as hereinafter set forth, shown in the drawings and claimed.

In the drawings: Figure 1 is a view in side elevation showing parts in section, illustrating one side of sprocket wheel on the pedal crank. Fig. 2 is substantially a similar view showing a larger sprocket wheel for increasing the speed of the vehicle, which sprocket wheel necessitates the bracket supports being differently adjusted than that shown in Fig. 1 so as to prevent the pedals from striking the ground. Fig. 3 is a bottom plan view of the adjustable crank-hanger for polycycles. Fig. 4 is an enlarged detail view of the bracket supports.

Referring more particularly to the drawings, 1 designates the rear wheels, which are mounted on the axle 2 having a sprocket 3, which axle 2 is mounted in suitable bearings 4 of the body 5 of the vehicle. Upon the under surface of the body adjacent its forward end are brackets 6, in bearings of which the forward axle 7 is mounted, to the ends of which axle the stub axles 8 are connected at 9 in the usual manner. Said stub axles are provided with the usual arms 10, which are connected to the usual form of steering mechanism 12, including the steering wheel 13 and shaft 14.

Upon the under surface of the body 5 are bracket supports 15, each support comprises two sections 16 and 17 pivoted together at 18. The pivoted ends of said sections are provided with hooks 19, which are disposed adjacent one another and constitute a bearing for the pedal crank shaft 20 having the pedals 21. By moving the sections 16 and 17 in the direction of the arrows 22, that is, when the bracket supports are detached from the body, the pedal crank shaft may be removed from its bearings, so that another crank shaft provided with a sprocket having a different ratio than that shown in Fig. 1 may be inserted. The sprocket on the pedal crank shaft is designated by the character 23, and over which and over the sprocket 3 a chain 24 travels. The opposite ends of the sections 16 and 17 terminate in laterally extending reduced parts or portions 25, mounted in bearings 26, which are secured adjustably to the under surface of the body 5, by means of the bolts 27 and 28, which extend through the slots 29 and 30. When arranging a sprocket 23 of different ratio, the bearings 26 at the rear may be adjusted rearwardly, while the forward bearings may be adjusted forwardly, so that the adjacent pivoted ends of the sections 16 and 17 may be brought or arranged closer to the body 5, so that the pedals will not strike or come in contact with the ground.

The invention having been set forth, what is claimed as new and useful is:—

1. In an adjustable crank-hanger for polycycles, a rear driven shaft having a sprocket and provided with wheels, a body, bracket supports adjustably connected to the body, each of said bracket supports comprising two sections pivoted together and having adjacent hooks at their pivoted ends, a pedal crank shaft detachably mounted in said adjacent hooks and provided with a sprocket wheel, and a sprocket chain passing about said sprockets.

2. In an adjustable crank-hanger for polycycles, a rear driven shaft having a sprocket and provided with wheels, a body, bracket supports, each comprising two sections, forward and rear bearings adjustably secured to the body in which the opposite ends of the sections of the bracket supports are mounted, the adjacent ends of the sections of each bracket support being pivoted together and having adjacent hooks at their pivoted ends forming a bearing, a pedal crank shaft detachably mounted in the hook bearings of said sections and provided with a sprocket wheel, and a sprocket chain passing about said sprockets.

In testimony whereof I have signed my name to this specification in the presence of two subscribing witnesses.

CHRISTIAN S. RUFF.

Witnesses:
 IRVIN G. LAMB,
 CHAS. H. ZIEGLER.